United States Patent
Hsiao et al.

(10) Patent No.: US 11,121,871 B2
(45) Date of Patent: Sep. 14, 2021

(54) SECURED KEY EXCHANGE FOR WIRELESS LOCAL AREA NETWORK (WLAN) ZERO CONFIGURATION

(71) Applicant: International Business Machines Corporation, Armonk, NY (US)

(72) Inventors: Chih-Wei Hsiao, Taipei (TW); Chih-Wen Chao, Taipei (TW); Wei-Hsiang Hsiung, Taipei (TW); Ya-Hsuan Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 16/166,200

(22) Filed: Oct. 22, 2018

(65) Prior Publication Data

US 2020/0127829 A1    Apr. 23, 2020

(51) Int. Cl.
*H04L 9/30* (2006.01)
*H04L 9/08* (2006.01)
(Continued)

(52) U.S. Cl.
CPC ............ *H04L 9/3073* (2013.01); *H04L 9/085* (2013.01); *H04L 9/0844* (2013.01);
(Continued)

(58) Field of Classification Search
CPC ..... H04L 9/3073; H04L 9/0844; H04L 9/085; H04W 76/10; H04W 12/0401; H04W 12/0806
See application file for complete search history.

(56) References Cited

U.S. PATENT DOCUMENTS 6,892,305 B1 * 5/2005 Dayan ................... G06F 21/575
713/1
7,120,129 B2    8/2006 Ayyagari et al.
(Continued)

FOREIGN PATENT DOCUMENTS

| EP | 3097750 A1 | 9/2016 |
| WO | 2017091145 A1 | 6/2017 |
| WO | 2017171900 A1 | 10/2017 |

OTHER PUBLICATIONS

Seoksoeng Jeon et al., Pre-shared Key Agreement for Secure Public Wi-Fi (Year: 2017).*

(Continued)

*Primary Examiner* — Mahfuzur Rahman
*Assistant Examiner* — Richard W Cruz-Franqui
(74) *Attorney, Agent, or Firm* — Jeffrey S. LaBaw; David H. Judson

(57) ABSTRACT

A technique to secure a wireless communication link that is being shared among a wireless access point (AP), and each of a set of wireless clients (each a mobile station (STA)) that are coupled to the AP over the communication link. A typical implementation is a WPA2-PSK communication link. In this approach, and in lieu of a single secret key being shared by all AP-STA pairs, each AP-STA pair derives its own unique WLAN shared secret, preferably via a Diffie-Hellman (DH) key exchange. The WLAN shared secret is then used to generate WPA2-PSK keys, namely, pairwise master key (PMK) and pairwise transient key (PTK), that establish an 802.11 standards-compliant secure link.

22 Claims, 3 Drawing Sheets

(51) Int. Cl.
*H04W 76/10* (2018.01)
*H04W 12/041* (2021.01)
*H04W 12/086* (2021.01)
*H04W 84/12* (2009.01)
*H04W 88/08* (2009.01)

(52) U.S. Cl.
CPC ....... *H04W 12/041* (2021.01); *H04W 12/086* (2021.01); *H04W 76/10* (2018.02); *H04W 84/12* (2013.01); *H04W 88/08* (2013.01)

(56) References Cited

U.S. PATENT DOCUMENTS

| | | | |
|---|---|---|---|
| 7,181,530 B1 | 2/2007 | Halasz et al. | |
| 7,404,077 B1* | 7/2008 | Peters | H04L 9/302 380/30 |
| 8,397,058 B1 | 3/2013 | Ezawa | G06Q 20/4097 713/155 |
| 8,484,466 B2 | 7/2013 | Marin et al. | |
| 8,582,773 B2 | 11/2013 | Zhang et al. | |
| 8,817,757 B2 | 8/2014 | Luo | |
| 9,510,201 B1* | 11/2016 | Shimoon | H04W 12/06 |
| 10,453,062 B2* | 10/2019 | Wolfs | G06Q 40/02 |
| 2004/0259552 A1* | 12/2004 | Ihori | H04W 12/033 455/445 |
| 2007/0206537 A1* | 9/2007 | Cam-Winget | H04W 12/06 370/331 |
| 2008/0195865 A1* | 8/2008 | Nikander | H04L 63/0442 713/170 |
| 2009/0019283 A1* | 1/2009 | Muralidharan | H04W 12/122 713/168 |
| 2009/0100267 A1* | 4/2009 | Brown | H04L 9/3066 713/176 |
| 2010/0115272 A1* | 5/2010 | Batta | H04W 12/033 713/162 |
| 2011/0201275 A1* | 8/2011 | Jabara | H04W 8/186 455/41.2 |
| 2011/0299686 A1* | 12/2011 | Saboff | H04W 12/08 380/274 |
| 2012/0023552 A1 | 1/2012 | Brown | |
| 2012/0054493 A1* | 3/2012 | Bradley | H04W 8/005 713/171 |
| 2012/0243680 A1* | 9/2012 | Little | H04L 9/3252 380/30 |
| 2013/0326233 A1* | 12/2013 | Tolfmans | G06F 21/602 713/189 |
| 2014/0067692 A1* | 3/2014 | Ye | G06Q 10/0835 705/75 |
| 2014/0130155 A1 | 5/2014 | An et al. | |
| 2016/0165410 A1* | 6/2016 | Purohit | H04L 63/065 370/311 |
| 2017/0195318 A1* | 7/2017 | Liu | H04L 67/2809 |
| 2017/0215069 A1* | 7/2017 | Nakajima | G06K 7/1413 |
| 2017/0265238 A1* | 9/2017 | Li | H04W 88/06 |
| 2017/0346644 A1* | 11/2017 | Cambou | H04L 9/3278 |
| 2018/0054845 A1* | 2/2018 | Lee | H04W 12/61 |
| 2018/0124670 A1* | 5/2018 | Alanen | H04W 36/165 |
| 2018/0167811 A1* | 6/2018 | Shi | H04W 48/16 |
| 2019/0020633 A1* | 1/2019 | Leavy | H04L 9/0841 |
| 2019/0182663 A1* | 6/2019 | Wang | H04W 12/06 |
| 2019/0223008 A1* | 7/2019 | Vanderveen | H04W 12/041 |
| 2020/0177393 A1* | 6/2020 | Lopez | H04L 9/3236 |
| 2020/0280436 A1* | 9/2020 | Nix | H04L 9/0618 |

OTHER PUBLICATIONS

O'Hara Bob, Addition of a Vendor-specific Information Element (Year: 2004).*
NPL Search (Google Scholar) (Year: 2021).*
Demer, "Why does WPA-PSK not use Dithe-Hellman key exchange," Stack Exchange Network, Jan. 1, 2013.
Agrawal, et al, "Preventing ARP spoofing in WLAN using SHA-512," Abstract, 2013 IEEE International Conference on Computational Intelligence, Dec. 2013.
Raju, et al "Secure Hotspot a novel approach to secure public Wi-Fi hotspot," Abstract, 2015 International Conference on Control Communication & Computing India (ICCC), Nov. 2015.

* cited by examiner

SECURED KEY EXCHANGE FOR WIRELESS LOCAL AREA NETWORK (WLAN) ZERO CONFIGURATION

BACKGROUND OF THE INVENTION

Technical Field

This disclosure relates generally to information security over publicly-accessible wireless networks.

Background of the Related Art

Wireless communication solutions that provide logical presence through physical roaming, or the ability to stay in touch on one's own terms, are in great demand. Today, these requirements are requested by mobile professionals and other workers who want to download E-mail, update their calendars, send or receive a fax, check inventory, place an order, record route status, call a client, or talk to a peer—in short a virtual office anywhere, anytime. The 802.11 standard, specified by the Institute of Electrical and Electronics Engineers (IEEE), defines wireless Ethernet, or wireless LAN (WLAN). Solutions employing 802.11a, b, and g are designed to replace or complement wired LANs with wireless technology, eliminating cable runs and the associated networking hardware. High-frequency WLANs, commonly called Wi-Fi, are specified in the 802.11a, b, and g specifications.

Wi-Fi Protected Access 2—Pre-Shared Key (WPA2-PSK), also called WPA or WPA2 Personal, is a method of securing a wireless network using Pre-Shared Key (PSK) authentication. In this approach, a secret key used to secure a connection is pre-shared between a wireless Access Point (AP), and each 802.11i supported client. The secret key is shared among each AP-client pair that uses the WPA2-PSK-enabled network. WPA-2-PSK is widely used as the wireless security scheme in many operating environments including, without limitation, public WLAN hotspots (e.g., airport lounges, cafes, etc.), small offices and the like. Because such networks often are self-managed (i.e., without Information Technology (IT) specialist support), the provider typically just publishes the WPA2 secret key for any customer seeking WLAN access. This common practice, however, is highly insecure, because as a practical matter the pre-shared secret key then becomes public. As such, anyone in range of the RF signal only needs to monitor over-the-air traffic to derive the relevant keys (the 802.11i pairwise master secret (PMK) and pairwise transient key (PTK)) used to secure the link. Indeed, several well-known attacks target this vulnerability. In particular, a rogue access point attack is one in which the attacker pretends to act as a legitimate AP (using a captured AP SSID) to attract the victim seeking to communicate over the link. A man-in-the-middle (MITM) attack is one in which the attacker intercepts and/or alters all traffic (e.g., DNS messages) for a specific victim, who is unaware of the nefarious behavior.

There remains a need to address this security vulnerability in WPA2-PSK wireless networking, preferably in a manner that does not require modification to the existing 80.211 specification.

BRIEF SUMMARY

This disclosure provides a technique to secure a wireless communication link that is being shared among a wireless access point (AP), and each of a set of wireless clients (each a mobile station (STA)) that is coupled to the AP over the communication link. A typical implementation is a WPA2-PSK communication link. In this approach, and in lieu of a single secret being shared by each AP-STA pair, each AP-STA pair derives and uses its own unique WLAN shared secret. Preferably, the WLAN shared secret is generated by each AP-STA pair automatically by using a Diffie-Hellman key exchange, with key material being conveniently transported (carried) within management frames that are otherwise used to carry information between devices on the link. The generated WLAN shared secret for the AP-STA pair is then used to generate WPA2-PSK keys, typically, a pairwise master key (PMK), and a pairwise transient key (PTK), that facilitate establishing a connection.

According to an embodiment, the AP and STA implement a cryptographic key exchange, preferably using Diffie-Hellman (DH) key exchange, with key material carried in the management frames. To this end, preferably the AP provides its DH public key in a beacon, and in a probe response; the STA provides its DH public key in an association request. After exchanging these public keys, the AP and STA compute a DH shared secret key (the WLAN shared secret). This key is then used to generate the PMK and PTK used to encrypt subsequent communications over the channel.

Preferably, the WLAN shared secret (namely, the DH shared secret key) is generated as follows. The AP is provisioned with a DH key pair comprising a DH private key (the "AP private key"), and its associated DH public key (the "AP public key"). Likewise, the STA is provisioned with its own DH key pair comprising a DH private key (the "STA private key"), and its associated DH public key (the "STA public key"). The respective AP and STA public keys are then exchanged, preferably in management frames (e.g., 802.11 management frames) normally generated and used by the devices. In particular, preferably the AP makes its AP public key available (e.g., to a STA seeking to associate with the AP) in an 802.11-based beacon, or a probe response, whereas preferably the STA makes it STA public key available (to the AP) in its association request (to the AP). Each of the AP and STA then dynamically compute the WLAN shared key, e.g., at the AP as DH (AP private key|STA public key), and at the STA as DH (STA private key|AP public key). Once this dynamic pre-shared key is generated, the AP uses it to compute the PMK. The AP then handshakes with the STA, and each side uses the PMK to generate the PTK.

The approach solves the vulnerability problems associated with customer WLAN access to these types of access points, and it provides a "zero configuration" WLAN solution.

According to another aspect, preferably the AP also publishes a portion of its DH public key in its SSID to prevent rogue AP attacks.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

As described above, the WLAN zero configuration technique of this disclosure is implemented in the context of a mobile device (a mobile station or STA) communicating with an access point (AP), typically over the 802.11 WPA2-PSK protocol. The following provides background on these technologies.

Figure 1:
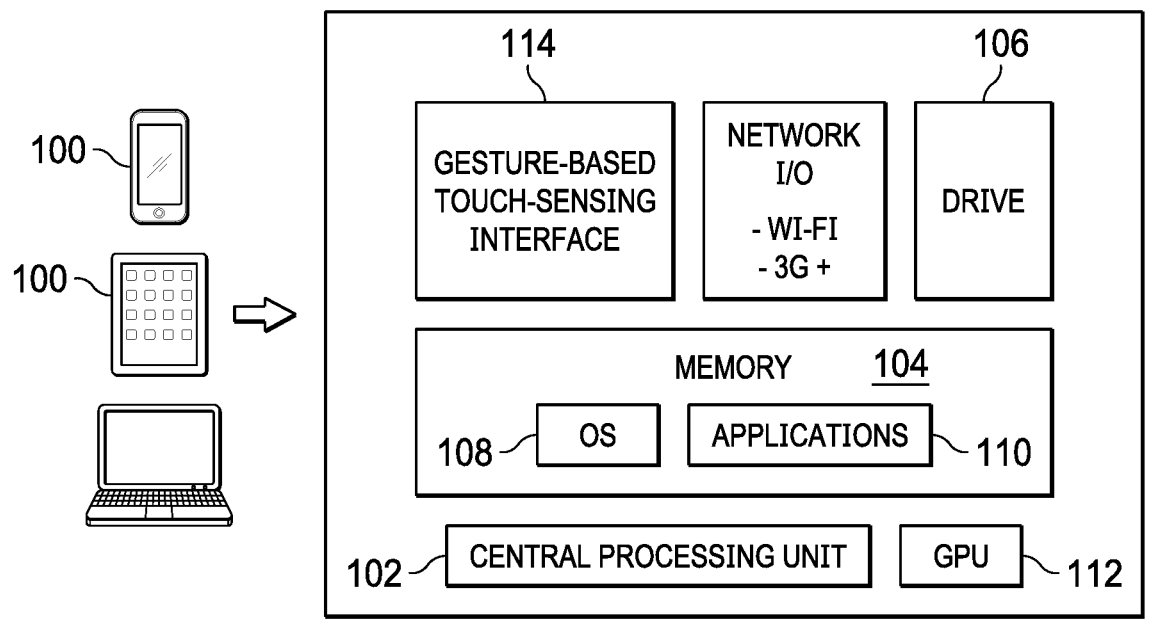
FIG. 1 illustrates a representative mobile device (STA) in which aspects of the disclosed technique may be implemented.

In particular, FIG. 1 illustrates representative mobile devices, namely, a smartphone 100, and a tablet device 102. As is well-known, such devices typically comprise fast processors, large amounts of memory, gesture-based multi-touch screens, and integrated multi-media and GPS hardware chips. Many of these devices use open mobile operating systems, such as Android™. The ubiquity, performance and low cost of mobile devices have opened the door for creation of a large variety of mobile applications including, without limitation, applications that require or take advantage of cryptographic operations. Such operations may be associated with a particular application, or the device operating system itself. As will be described, the techniques herein may be implemented with respect to any computing entity application.

In a representative but non-limiting embodiment, a mobile device is a smartphone or tablet, such as the iPhone® or iPad®, an Android™-based mobile device, or the like. Referring back to FIG. 1, a device of this type typically comprises a CPU 102, computer memory 104, such as RAM, and a data store 106. The device software includes operating system (e.g., Apple iOS®, Android™, Blackberry OS®, Windows Mobile®, or the like) 108, and generic support applications and utilities 110. Typically, the device includes a separate graphics processing unit (GPU) 112. A touch-sensing device or interface 114, such as a capacitive touchscreen, is configured to receive input from a user's touch and to send this information to processor 112. The interface 114 responds to gestures on the touch sensitive surface. Other input/output devices include software-based keyboards, cameras, microphones, accelerometers, magnetometers, radio or WiFi mechanisms, and the like.

More generally, the mobile device is any wireless client device, e.g., a cellphone, pager, a personal digital assistant (PDA, e.g., with GPRS NIC, WiFi card, etc.), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

For example, a mobile device as used herein is a 3G—(or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Typically, computing devices such as described also implement networking technology for exchanging data over short distances, such as Bluetooth, which is a wireless technology standard that uses short-wavelength UHF radio waves in the ISM band from 2.4 to 2.485 GHz). Devices that implement Bluetooth can create personal area networks (PANs). Bluetooth can connect to several devices at once. Alternatives to Bluetooth include, without limitation, ultra-wideband, induction wireless, and others.

The underlying network transport may be any communication medium including, without limitation, cellular, wireless, Wi-Fi, small cell (e.g., Femto), and combinations thereof.

Figure 2:
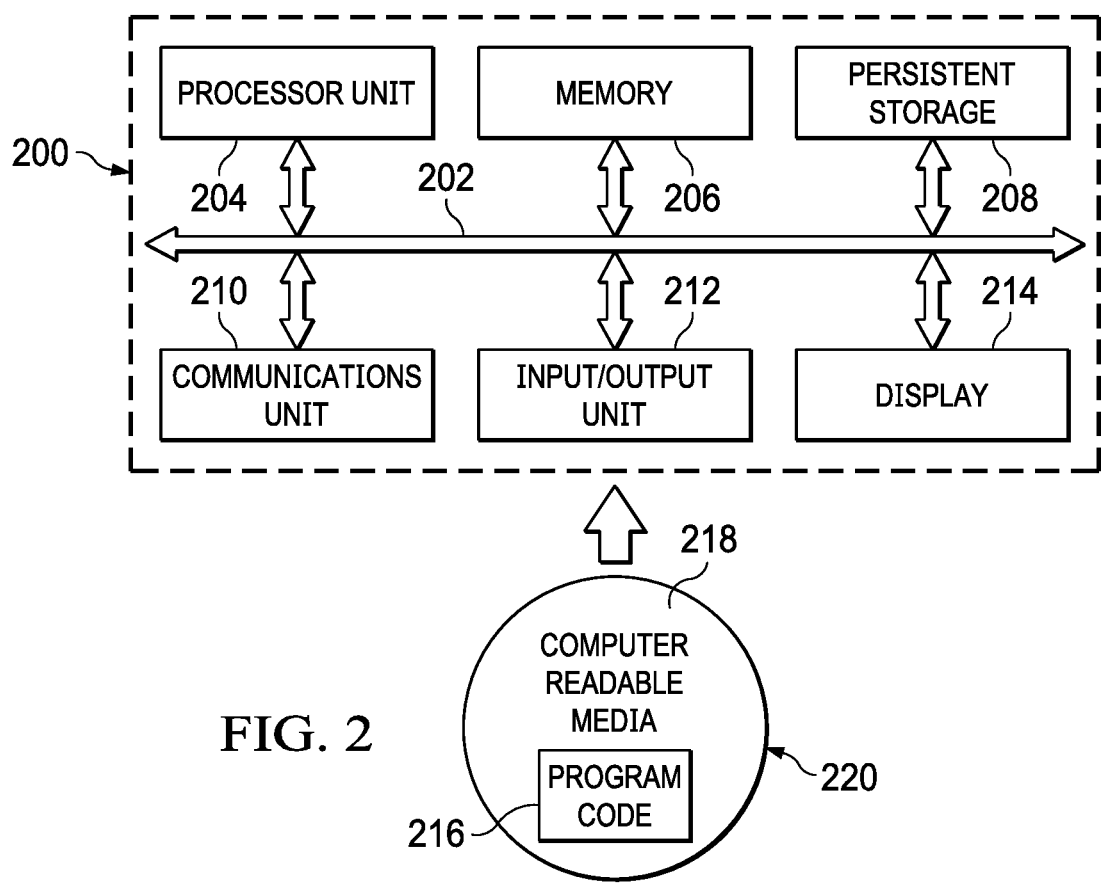
FIG. 2 is an exemplary block diagram of a data processing system implemented as a wireless access point (AP) and in which aspects of the disclosed technique may be implemented.

With reference now to FIG. 2, a block diagram of an exemplary data processing system is shown and in which aspects of a WLAN zero configuration scheme of this disclosure may be implemented. Data processing system 200 is an example of a computer in which computer usable code or instructions implementing the processes for illustrative embodiments of the disclosure may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. For a wireless access point (AP), the network interface card includes appropriate hardware and software support to implement the 802.11 protocol including, in particular, 802.11 WPA2-PSK. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

WPA2-PSK Communication

Figure 3:
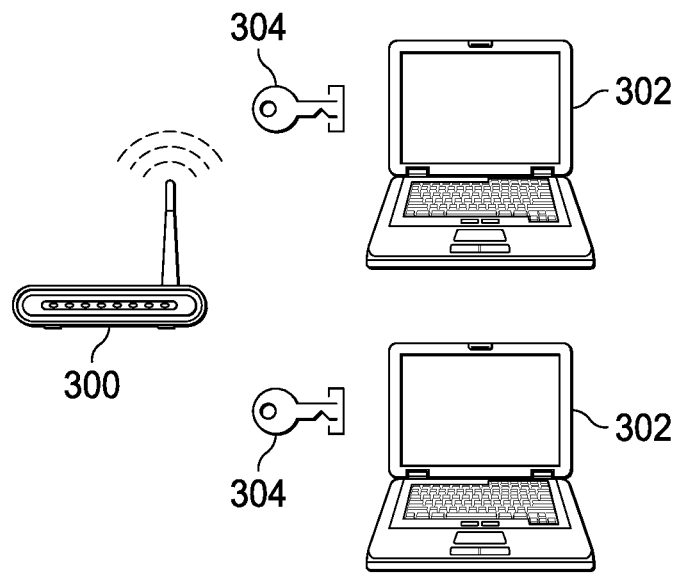
FIG. 3 illustrates a known 802.11 WPA2-PSK solution in which a mobile station (STA) joins a wireless access point (AP) using a pre-shared key is shared by each participating STA.
Figure 4:
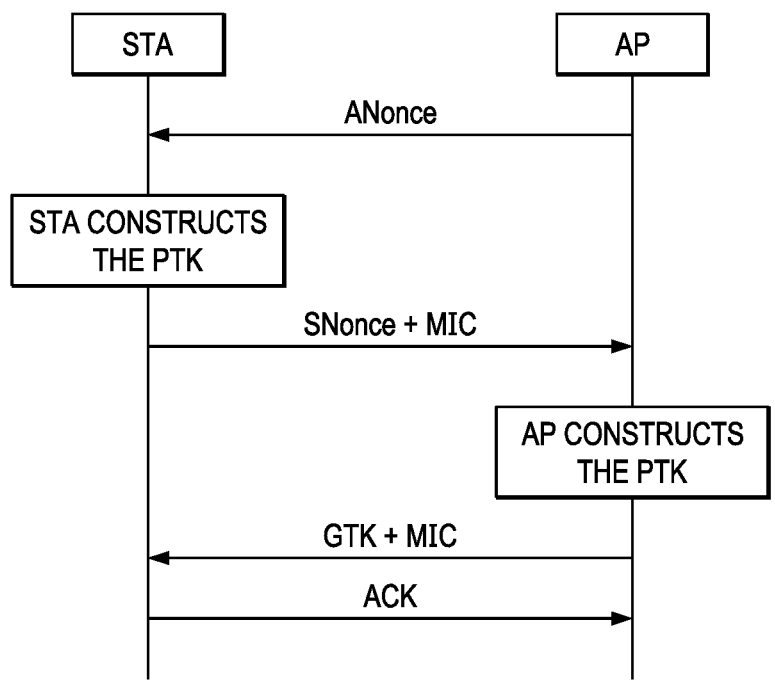
FIG. 4 depicts a conventional 802.11i 4-way handshake.

FIG. 3 depicts a conventional WPA2-PSK link used, for example, in a public WLAN hotspot. Familiarity with the WPA2-PSK protocol is assumed. In this operating environment, one or more mobile stations (each a STA 302) are coupled over-the-air to a wireless access point (AP) 300. In this known approach, each STA-AP pair shares the same secret key 304. As has been described, however, and because the operating environment itself is public, in effect the secret key 304 is public, as it can be easily obtained by sniffing the air traffic, or by an attacker masquerading as a man-in-the-middle. In conventional WPA2-PSK, the AP and STA use the secret key 304 to generate a pairwise master key (PMK), which in turn is used to generate a pairwise transient key (PTK), all in a known manner and as depicted in the 802.11i 4-way handshake shown in FIG. 4. The link is secured, from at least a theoretical standpoint, using these keys.

Secured Key Exchanging Method for WLAN Zero Configuration

With the above as background, the WLAN zero configuration technique of this disclosure is now described.

To this end, and in lieu of the secret (de facto public) key 300 that is shared by all AP-STA pairs, instead each AP and STA pair implements a private cryptographic key exchange, preferably using Diffie-Hellman (DH) key exchange, with the result that each of the AP-STA pairs generates a secure secret key that is unique to (and only used by) the pair. The Diffie-Hellman key exchange method allows two parties that have no prior knowledge of each other to jointly establish a shared secret key over an insecure channel, and this key can then be used to encrypt subsequent communications. In the technique herein, the DH shared secret key corresponds to a dynamically-generated and unique (to the AP-STA pair) WLAN shared secret, and this key (once again in lieu of the secret key 300) is then used to generate the standards-compliant PMK and PTK used to encrypt subsequent communications over the channel.

Preferably, the WLAN shared secret (namely, the DH shared secret key) is generated as follows. In particular, the AP is provisioned or configure with a DH key pair comprising a DH private key (the "AP private key"), and its associated DH public key (the "AP public key"). This notion of provisioning or configuring may include the device obtaining the key pair from some other source as needed, on-demand, or upon a given occurrence. Likewise, the STA is provisioned with its own DH key pair comprising a DH private key (the "STA private key"), and its associated DH public key (the "STA public key"). The respective AP and STA public keys are then exchanged, preferably in standards-compliant wireless management frames (e.g., 802.11 management frames). Other out-of-band (OOB) techniques may be used (in lieu of the 802.11 management frames) for this purpose. In a preferred embodiment, preferably an AP makes its AP public key available (e.g., to a STA seeking to associate with the AP) in an 802.11-based beacon, or in a probe response, whereas preferably the STA makes its STA public key available (to the AP) in its association request (to the AP). Each of the AP and STA then dynamically compute the WLAN shared key that is unique to their pairing. To this end, the AP computes DH (AP private key|STA public key), and the STA computes DH (STA private key|AP public key). Once this dynamic pre-shared key is generated, the AP uses it to compute the pairwise master key (PMK) for the session. The AP then handshakes with the STA, and each side uses the PMK to generate the PTK, all according to the existing 802.11 WPA2-PSK protocol.

Thus, the above-described technique (with the AP preferably providing its public key in the probe response and beacon, and the STA preferably providing its public key in the association request) enables each device to generate the WLAN shared secret automatically using Diffie-Hellman. Preferably, each AP-STA pair implements a similar WLAN zero configuration scheme, and thus each pair has a different WLAN shared secret. With devices operating in this manner, the 802.11 WPA2-PSK secrets are protected from discovery and the link is secured for each respective Wi-Fi session.

Preferably, the DH key exchange uses elliptic curve (EC)-generated ciphers, although other signature schemes may be used as well. Thus, for example a representative public key included in the VIE element of a beacon and probe response may be as follows:
|Public Key in Base64|such as IGFu0ZCBpbm3RI7ZdmF0aWAdhYm.

A representative partial public key that the AP includes in the SSID of the beacon and probe response may be as follows:
|Provider Name|_|partial Public Key in Base64|such as IBM_IFGu0ZC.

A representative public key that the STA includes in the VIE of an association request may be as follows:
|Public Key in Base64|such as NtQ5YWxAzLCB3aGlja9CBp2cyB1Xc3Qg.

Preferably short key-size EC curves are used to enable the partial public key to fit into the SSID. Preferably, a maximum size of the EC key is 192, and the maximum length of the SSID is 32.

The Beacon, Probe Request and Response and Association Request and Response are 802.11 management frames that includes a plurality of data fields. One of those fields includes the AP's SSID, and one or more other fields may include Vendor Specific Information Elements (each a VIE). According to the WLAN zero configuration scheme of this disclosure, preferably the AP publishes its full DH-based AP public key in a beacon field VIE, and it also publishes a portion of the AP public key in the SSID field. By including a portion of the AP public key in the SSID, the approach herein also mitigates rogue AP attacks. Other data fields in these management frames may be used to carry the full and partial versions of the DH-based AP public key. A STA requesting a connection to the AP typically sends its 802.11 probe request for all available access points. According to the approach herein, however, instead of issuing a general probe request, preferably the STA instead sends a probe request for a specific AP, namely, the one the issues the beacon that includes the DH public key material. The specific AP is determined by the AP's full and partial public keys that the STA obtains (from the beacon) and then includes in respective VIE and SSID fields in the probe response.

Figure 5:
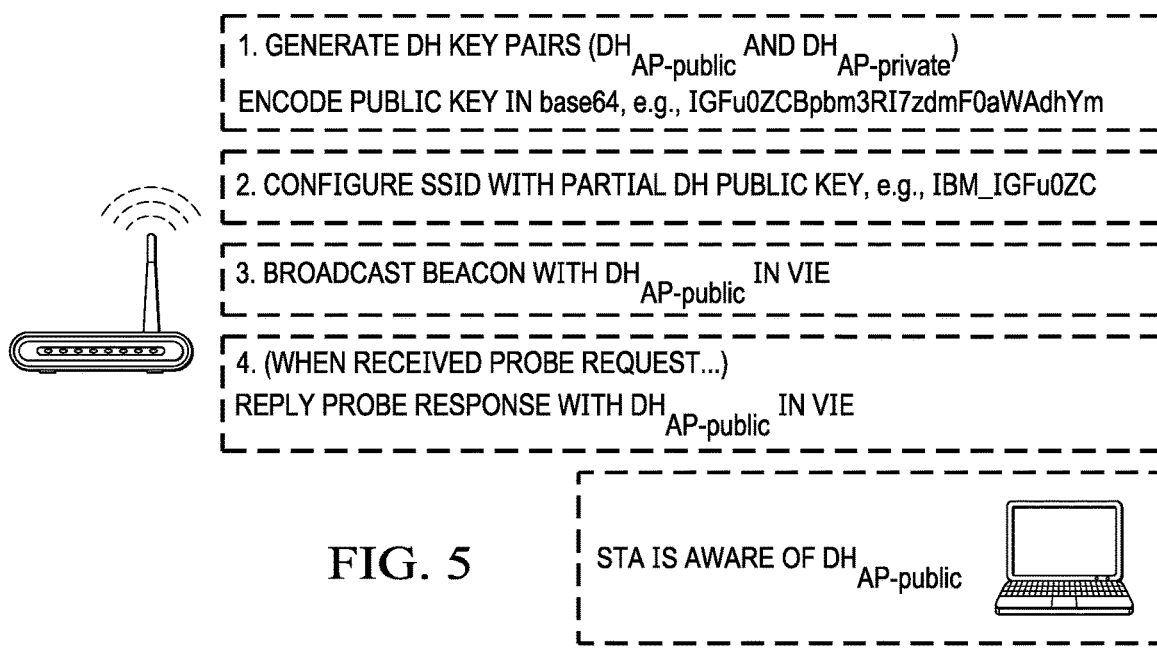
FIG. 5 and FIG. 6 depicts a WLAN zero configuration technique of this disclosure.
Figure 6:
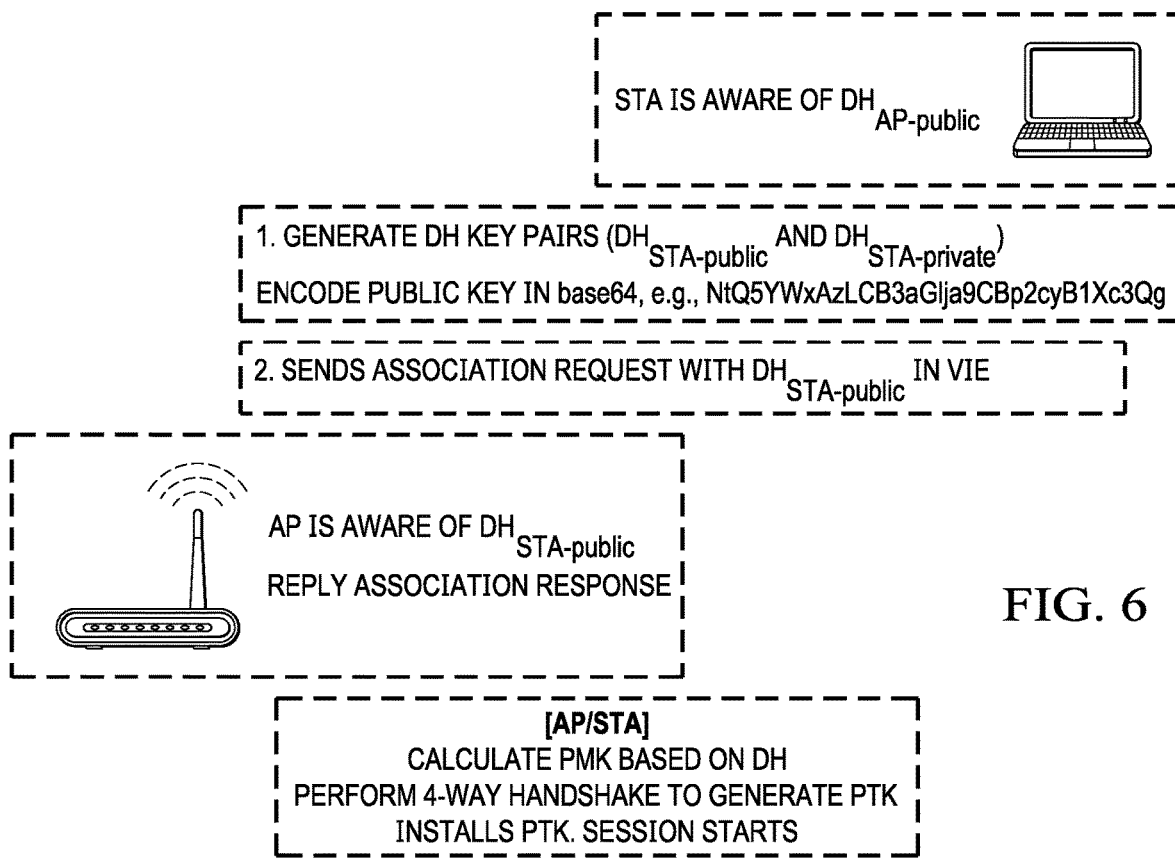

FIG. 5 and FIG. 6 depict the operation of the zero configuration WLAN technique of this disclosure in additional detail using the example key material. In FIG. 5, at step (1), the access point generates the DH key pair, namely, $DH_{AP-public}$ and $DH_{AP-private}$, and encodes the public key in base64, e.g., the data string IGFu0ZCBpbm3RI7ZdmF0aWAdhYm. At step (2), the access point configures its SSID with the partial DH public key, e.g., the data string IBM_IFGu0ZC. At step (3), the access point broadcasts the Beacon (a beacon frame) with $DH_{AP-public}$ in a VIE. Step (4) depicts the access point in the alternative responding to a Probe Request (received from a STA) with a Probe Response Reply that includes $DH_{AP-public}$ in a VIE. As such, and as depicted the STA thus is aware of $DH_{AP-public}$. Referring now to FIG. 6, at step (1) there the STA generates the DH key pair, namely, $DH_{STA-public}$ and $DH_{STA-private}$, and encodes the public key in base64, e.g., the data string identified above in the example as NtQ5YWxAzLCB3aGlja9CBp2cyB1Xc3Qg. At step (2), the STA sends an Association Request with $DH_{STA-public}$ in a VIE. As such, and as depicted the AP thus is aware of $DH_{STA-public}$ and issues the Reply Association Response. According, as both devices now have the necessary key material, they calculate the PMK based on Diffie-Hellman, perform the 4-way handshake (shown in FIG. 4) to generate the PTK, and then install the PTK to enable the session to start.

Thus, according to the technique herein, the AP and STA generate their own public/private key pairs, and the STA acquires the AP's DH public key (as well as the portion thereof as the partial key) and attempts to connect to the AP as depicted in FIG. 5. Before responding to the AP, the STA preferably validates the partial DH AP public key (received in the SSID) against the full DH AP public key (received in the VIE). If the validity check fails, the STA determines that the AP is rogue (acting as an MITM), and it can then terminate the attempt to associate with the AP. If, however, the validity check is positive, and as shown in FIG. 6, the devices pair with one another. The STA computes the PMK based on DH (STA private key|AP public key) as the dynamic pre-shared key. The AP computes the PMK based on DH (AP private key|STA public key). Both devices now possess the PMK. The AP sends the STA an association response indicating a successful association and performs 802.11 WPA2-PSK 4-way handshake. In this manner the pairwise transient key (PMK) is derived and installed on both the AP and the STA. Communications are then secured over the link using the PTK, once again in compliance with the 802.11 WP2-PSK standard.

The technique of this disclosure provides significant advantages. The approach solves the vulnerability problems (rogue AP and hostile MITM) associated with end user WLAN access to these types of access points, and it provides a "zero configuration" WLAN solution that requires no change to the existing 802.11 specification and no user interaction. In the approach as described, the key exchange and WLAN master secret derivation is automated as configured devices come within proximity of one another. The technique is readily implemented by leveraging 802.11 management frames to transport Diffie-Hellman key materials, thereby enabling each of the AP and a STA to privately and securely generate a WLAN master secret that only they share for the Wi-Fi session, all while maintaining conformance with (and no changes to) the 802.11 protocol.

The particular hardware and software implementation details described herein are merely for illustrative purposes are not meant to limit the scope of the described subject matter.

More generally, computing devices within the context of the disclosed subject matter are each a data processing system (such as shown in FIG. 1 or FIG. 2) comprising hardware and software, and these entities communicate with one another over a network, such as the 802.11 communications medium or link described. The technique may also be leveraged for other pre-shared key and open Wi-Fi scenarios. Still more generally, the subject matter described herein can take the form of an entirely hardware embodiment, an entirely software embodiment or an embodiment containing both hardware and software elements. In a preferred embodiment, the key exchange and WLAN shared key functionality is implemented in software, which includes but is not limited to firmware, resident software, microcode, and the like. Furthermore, the above-described WLAN zero configuration functionality (in whole or in part) can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the functionality (in whole or in part) is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to network-connected machines, such as described above.

Having described our invention, what we claim is as follows.

The invention claimed is:

1. A method to establish a secure session to a wireless network access point (AP) in an automated manner, comprising:
  outputting a first public key of a first cryptographic key pair, the first cryptographic key pair uniquely associated with the AP, the first public key output in a first element of a management frame issued from the AP, the management frame also including a second element distinct from the first element and that includes a portion of the first public key;
  receiving a second public key of a second cryptographic key pair, the second cryptographic key pair uniquely associated with a mobile station (STA) seeking to associate with the AP, the second public key output in a management frame issued from the STA;
  computing a shared secret using the second public key received from the STA and a private key of the first cryptographic key pair, the shared secret being uniquely associated with the AP and STA pair; and
  using the shared secret to complete a handshake between the AP and the STA, thereby setting up a secure communication link between the AP and STA pair.

2. The method as described in claim 1 wherein the handshake is a Wi-Fi Protected Access 2-Pre-Shared Key (WPA2-PSK) handshake.

3. The method as described in claim 1 wherein the first cryptographic key pair and the second cryptographic key pair are each Diffie-Hellman key pairs.

4. The method as described in claim 1 wherein the management frame issued from the AP is one of: a beacon, and a probe response.

5. The method as described in claim 1 wherein the management frame issued from the STA is an association request.

6. The method as described in claim 1 wherein the first element is a vendor information element (VIE) and the second element is a Service Set IDentifier (SSID) element, wherein comparison by the STA of the portion to the first public key enables the STA to verify that the AP is not operating in a rogue manner.

7. An apparatus configured as an access point in a wireless network, comprising:
a processor;
computer memory holding computer program instructions executed by the processor, the computer program instructions comprising program code configured to:
output a first public key of a first cryptographic key pair, the first cryptographic key pair uniquely associated with the AP, the first public key output in a first element of a management frame issued from the AP, the management frame also including a second element distinct from the first element and that includes a portion of the first public key;
receive a second public key of a second cryptographic key pair, the second cryptographic key pair uniquely associated with a mobile station (STA) seeking to associate with the AP, the second public key output in a management frame issued from the STA;
compute a shared secret using the second public key received from the STA and a private key of the first cryptographic key pair, the shared secret thereafter being uniquely associated with the AP and STA pair; and
use the shared secret to complete a handshake between the AP and the STA, thereby setting up a secure communication link between the AP and STA pair.

8. The apparatus as described in claim 7 wherein the handshake is a Wi-Fi Protected Access 2-Pre-Shared Key (WPA2-PSK) handshake.

9. The apparatus as described in claim 7 wherein the first cryptographic key pair and the second cryptographic key pair are each Diffie-Hellman key pairs.

10. The apparatus as described in claim 7 wherein the management frame issued from the AP is one of: a beacon, and a probe response.

11. The apparatus as described in claim 7 wherein the management frame issued from the STA is an association request.

12. The apparatus as described in claim 7 wherein the first element is a vendor information element (VIE) and the second element is a Service Set IDentifier (SSID) element, wherein comparison by the STA of the portion to the first public key enables the STA to verify that the AP is not operating in a rogue manner.

13. A computer program product in a non-transitory computer readable medium for use in a data processing system configured as an access point a wireless network, the computer program product holding computer program instructions executed by the data processing system, the computer program instructions comprising program code configured to:
output a first public key of a first cryptographic key pair, the first cryptographic key pair uniquely associated with the AP, the first public key output in a first element of a management frame issued from the AP, the management frame also including a second element distinct from the first element and that includes a portion of the first public key;
receive a second public key of a second cryptographic key pair, the second cryptographic key pair uniquely associated with a mobile station (STA) seeking to associate with the AP, the second public key output in a management frame issued from the STA;
compute a shared secret using the second public key received from the STA and a private key of the first cryptographic key pair, the shared secret thereafter being uniquely associated with the AP and STA pair; and
use the shared secret to complete a handshake between the AP and the STA, thereby setting up a secure communication link between the AP and STA pair.

14. The computer program product as described in claim 13 wherein the handshake is a Wi-Fi Protected Access 2-Pre-Shared Key (WPA2-PSK) handshake.

15. The computer program product as described in claim 13 wherein the first cryptographic key pair and the second cryptographic key pair are each Diffie-Hellman key pairs.

16. The computer program product as described in claim 13 wherein the management frame issued from the AP is one of: a beacon, and a probe response.

17. The computer program product as described in claim 13 wherein the management frame issued from the STA is an association request.

18. The computer program product as described in claim 13 wherein the first element is a vendor information element (VIE) and the second element is a Service Set IDentifier (SSID) element, wherein comparison by the STA of the portion to the first public key enables the STA to verify that the AP is not operating in a rogue manner.

19. An apparatus configured as a mobile station (STA) operating in a wireless network, comprising:
a processor;
computer memory holding computer program instructions executed by the processor, the computer program instructions comprising program code configured to:
receive a first public key of a first cryptographic key pair, the first cryptographic key pair uniquely associated with an access point (AP) to which the STA seeks to associate, the first public key having been output in a first element of a management frame issued from the AP, the management frame also including a second element distinct from the first element and that includes a portion of the first public key;
output a second public key of a second cryptographic key pair, the second cryptographic key pair uniquely associated with the STA, the second public key output in a management frame issued from the STA;
compute a shared secret using the first public key received from the AP and a private key of the second cryptographic key pair, the shared secret thereafter being uniquely associated with the AP and STA pair; and
use the shared secret to complete a handshake between the AP and the STA, thereby setting up a secure communication link between the AP and STA pair.

20. The apparatus as described in claim 19 wherein the handshake is a Wi-Fi Protected Access 2-Pre-Shared Key (WPA2-PSK) handshake.

21. The apparatus as described in claim 19 wherein the first cryptographic key pair and the second cryptographic key pair are each Diffie-Hellman key pairs.

22. The apparatus as described in claim 19 wherein the first element of the management frame issued from the AP is a vendor information element (VIE) and the second element is a Service Set IDentifier (SSID) element, and wherein the program code is further configured to validate that the portion is part of the first public key, thereby confirming that the AP is not operating in a rogue manner.

\* \* \* \* \*